United States Patent [19]
Oates et al.

[11] Patent Number: 5,976,243
[45] Date of Patent: Nov. 2, 1999

[54] PROCESS FOR PRODUCING CEMENT CLINKER CONTAINING BLAST FURNACE SLAG

[75] Inventors: David Bridson Oates, Kettleby; Alan Melvin Van Sloten, Vineland Station; Kevin Moire Cail, Aurora, all of Canada

[73] Assignee: Lafarge Canada Inc., Canada

[21] Appl. No.: 09/159,792

[22] Filed: Sep. 24, 1998

[51] Int. Cl.⁶ .............. C04B 2/10; C04B 7/14; C04B 7/47
[52] U.S. Cl. .......... 106/767; 106/745; 106/763; 106/707; 106/789
[58] Field of Search ................... 106/745, 756, 106/763, 767, 707, 789

[56] References Cited

U.S. PATENT DOCUMENTS 5,494,515 2/1996 Young ...................... 106/767

*Primary Examiner*—Michael Marcheschi
*Attorney, Agent, or Firm*—Bachman & LaPointe, P.C.

[57] ABSTRACT

Undried blast furnace slag, for example, granulated blast furnace slag having a water content of 3 to 20, generally 5 to 15%, by weight, is introduced to hot clinker in a cooler downstream of a cement kiln; the water is volatilized or evaporated in the cooler to provide a cement clinker having an effective content of dried blast furnace slag free of water; this permits use of blast furnace slag in a blended cement without the need for separate special steps for drying the slag.

19 Claims, 1 Drawing Sheet

PROCESS FOR PRODUCING CEMENT CLINKER CONTAINING BLAST FURNACE SLAG

BACKGROUND OF THE INVENTION i) Field of the Invention

This invention relates to a process for producing a cement clinker having an effective content of blast furnace slag; more especially the invention is concerned with a process in which a blast furnace slag having a content of water is the source of the blast furnace slag content of the cement clinker and is introduced directly into the cement clinker during a finishing stage of its manufacture.

ii) Description of Prior Art

In a cement plant, cement clinker is created at elevated temperatures in a cement kiln from cement clinker raw ingredients which travel through the kiln from a feed end to a discharge end, while passing through different processing zones at elevated temperatures.

The resulting hot cement clinker which typically has a temperature of about 1300° C. at the discharge end of the kiln, is fed into a cooler and travels as a bed of clinker from the cooler entry port to the cooler exit port on a cooler grate. Air is blown through the bed from jets disposed below the grate to cool the hot clinker. The clinker at the cooler entry port has a temperature of about 1300° C. and the clinker at the cooler exit port has a temperature of about 120° C.

The cooled cement clinker is ground to a desired fineness and may be employed as such in cement or may be admixed with blast furnace slag to produce a blended cement.

The use of blast furnace slag in admixture with a hydraulic cement such as Portland Cement, is well established.

Typically the blast furnace slag is subjected to drying operations at elevated temperatures to drive off water present in the slag. The Portland Cement and the dried slag are then intermixed and interground to a desired fineness or the dried slag is ground to a desired fineness and thereafter mixed with ground Portland Cement.

Blast furnace slag is a by-product from the production of iron in a blast furnace; silicon, calcium, aluminum, magnesium and oxygen are the major elemental components of the slag.

Blast furnace slags include air-cooled slag resulting from solidification of molten blast furnace slag under atmospheric conditions; granulated blast furnace slag, a glassy granular material formed when molten blast furnace slag is rapidly chilled as by immersion in water; and pelletized blast furnace slag produced by passing molten slag over a vibrating feed plate where it is expanded and cooled by water sprays, whence it passes onto a rotating drum from which it is dispatched into the air where it rapidly solidifies to spherical pellets.

In general the glass content of the slag determines the cementitious character, rapidly cooled slags have a higher glass content and are cementitious; slowly cooled slags are non-glassy and crystalline and thus do not have significant cementitious properties.

Blended hydraulic cements containing blast furnace slag include Portland Blast-Furnace Slag Cement Type IS, Slag Cement Type S and Slag-Modified Portland Cement Type I (SM) all of ASTM C 595 M; and Portland blast-furnace slag cement Type 105, and Slag-Modified Portland Cement Type 10 SM both of CSA-A362.

Blast furnace slags contain 3 to 20%, generally 5 to 15%, by weight, of water which must be removed prior to grinding or intergrinding with Portland Cement. The removal of the water content of blast furnace slags is typically carried out in a separate purpose built drying oven, and this drying oven and its operation at elevated temperature represents an additional cost in the manufacture of blended hydraulic cements containing blast furnace slag.

SUMMARY OF THE INVENTION

It is an object of this invention to provide a process for producing a cement clinker having an effective content of blast furnace slag.

It is a particular object of this invention to provide such a process for the production of a blended hydraulic cement.

It is a further particular object of this invention to provide a process for producing blended hydraulic cements containing blast furnace slag in which a separate drying stage for the slag, prior to admixing with the cement clinker, is avoided.

In accordance with the invention there is provided a process for producing a cement clinker having an effective content of blast furnace slag comprising: a) producing cement clinker, at an elevated temperature, from cement clinker raw ingredients in a cement kiln; b) feeding hot cement clinker from step a) into a cooler; c) feeding a blast furnace slag having a content of a water into contact with said hot cement clinker at an elevated temperature in said cooler and liberating said blast furnace slag of said water at said elevated temperature in the presence of the hot cement clinker in said cooler; and d) recovering a cooled cement clinker containing said blast furnace slag free of said water.

DESCRIPTION OF PREFERRED EMBODIMENTS i) Blast Furnace Slag

The invention extends to blast furnace slags generally including air-cooled blast furnace slags and water-cooled blast furnace slags.

The blast furnace slag is preferably a cementitious slag, for example, granulated blast furnace slag or pelletized blast furnace slag. These slags have a glass content resulting from rapid quenching with water, which is typically above 90%, by weight, and have a water content of 3 to 20%, generally 5 to 15%, by weight. Pelletized blast furnace slag generally has a lower water content in the range of 5 to 10%, by weight.

Granulated blast furnace slag has a particle or granule size of up to 0.25 inches or up to 4.75 mm. Pelletized blast furnace slag has a pellet size up to 0.5 inches.

The analytical content of blast furnace slags in North America indicated, for analytical purposes as oxides, except for the sulphur content as set out in Table I below:

TABLE I

| Chemical Constituent (as oxides) | Range of Composition in %, by weight |
| --- | --- |
| $SiO_2$ | 32–42 |
| $Al_2O_3$ | 7–16 |
| CaO | 32–45 |
| MgO | 5–15 |
| S | 0.7–2.2 |
| $Fe_2O_3$ | 0.1–1.5 |
| MnO | 0.2–1.0 | ii) Process

The undried blast furnace slag, which thus contains water, is added to a travelling bed of hot cement clinker in the cooler, downstream of the cement kiln, at this stage the cement clinker is granular, typically composed of particles ranging up to 10 to 12 inches. The hot cement clinker travels along a path from the upstream end to the downstream end of the cooler.

The bed of cement clinker is typically 6 to 24 inches thick, travels at a velocity which varies depending on the cooler dimensions and the throughput of the kiln; typically the velocity is about 2 to 6 ft./min., and has a temperature which ranges from about 1300° C. at the entry port to the cooler, immediately downstream of the cement kiln, to 100–150° C., typically about 120° C. at the clinker discharge port of the cooler.

Generally, the clinker has a residence time of 15 to 60, more usually 20 to 40, and typically about 30 minutes in the cooler. The clinker in the clinker bed varies in size and may include agglomerates as large as 10 to 12 inches.

Jets of cooling air are directed through the travelling clinker bed, typically from below the bed. The large volume of cooling air fed into the cooler typically has two outflow paths from the cooler, one in a generally upstream direction from the cooler into the cement kiln where it provides secondary air for the thermal processes taking place in the cement kiln; and the other in a generally downstream direction and exiting through dust collectors at the downstream end of the cooler.

The hot clinker is thus exposed to cooling air in the path of travel of the bed so that the clinker is progressively cooled from about 1300° C. to about 120° C. as it travels from the upstream end to the downstream end.

The undried blast furnace slag is introduced to the travelling bed of cement clinker so that the slag travels with the cement clinker towards the exit port of the cooler. In addition the slag is introduced to the travelling bed of clinker at a point such that the slag has an adequate residence time in the cooler, at a sufficiently high temperature for volatilization or evaporation of the water content of the slag to produce a dry slag content in the clinker.

The point of introduction of the slag may vary depending on different factors including:

i) the physical state of the slag;

ii) the water content;

iii) site of introduction on or within the bed of clinker;

iv) the cooler configuration.

The undried slag is subjected to drying and volatilization or evaporation of the water as it travels with the clinker bed, and the slag is typically entrapped in pockets between adjacent clinker particles.

If the water content is low, less heat or a lower residence time is necessary for volatilization or evaporation of the water content, so that introduction at a downstream portion of the cooler, where the temperature is lower, may suffice.

In particular the undried slag is introduced to the clinker, in the cooler, such that the undried slag is conveyed with the clinker towards the cooler exit port, and the undried slag is exposed to a temperature and residence time effective for volatilization or evaporation of the water while maintaining the integrity of the slag which maintains its identity while being associated with the clinker. As the clinker reaches the exit port of the cooler, the slag may be present as a top layer penetrating the upper zone of the clinker bed or may be admixed with the clinker as a result of movement or agitation of clinker particles during travel through the cooler, or as a result of the initial delivery of the slag to the interior of the bed.

In general the undried slag will be introduced to the clinker at a region of the cooler to ensure adequate exposure of the slag to heat and residence time sufficient for volatilization or evaporation of the water content; but for the reasons indicated above considerable variation is permissible in individual cases.

It will be recognized that since water evaporates or volatilizes at above 100° C., there is considerable scope to introduce the undried slag at almost any region of the cooler. In order to ensure complete drying it is generally preferred to introduce the undried slag to a region of the cooler having a temperature of at least 150° C.

Various delivery means may be employed for introducing the undried slag to the clinker, and the design and location of suitable delivery means in the cooler is well within the skill of persons in the art. For example, the slag may be introduced by a reclaim screw auger.

The undried slag is suitably introduced to the clinker in the cooler in an amount to provide a content of slag in the clinker generally of 10 to 75%, by weight, and more especially of about 25 to 70%, by weight, based on the combined weight of the slag and the clinker, where a Portland Blast-Furnace Slag Cement satisfying ASTM C 595-95a is desired; and an amount of 10 to 25%, by weight, based on the combined weight of the slag and the clinker, where a Slag-Modified Portland Cement is desired satisfying ASTM C 595-95a.

iii) Cement

The cement clinker and blast furnace slag, for example, dried granulated blast furnace slag, recovered from the cooler is ground to a desired fineness of the cement clinker. Employing the process of the invention the slag is thus interground with the cement clinker achieving a homogeneous mixing and distribution of the slag throughout the cement, in the normal grinding operation to which the clinker is subjected.

The cement clinker may also be mixed with other components, for example, flyash or limestone. In this case the cement clinker with the slag component may be interground with the slag or limestone, or the cement clinker with the slag component, and the flyash or limestone may be ground separately, and be subsequently mixed together.

Furthermore clinker or dried blast furnace slag from other sources may be admixed with the resulting cement clinker to adjust the physical characteristics to specific or desired characteristics.

The cement clinker is preferably Portland Cement clinker.

iv) Other Additions

In addition to blast furnace slag, other additions desired in blended cements, and which require drying to remove water, may also be introduced into the cooler in an appropriate region to effect drying and removal of water from the addition. Suitable additions are undried coal ashes, for example, fly ash and bottom ash which are employed as components with blast furnace slags in blended cements, with cement clinker. The coal ashes are added in the same general manner as the slags, but may also be introduced pneumatically to the clinker in the cooler, in view of their fine particle form.

Additionally coal ashes having a content of carbon may be introduced in the cooler, for removal of both the carbon and water, in the production of a blended cement of clinker, blast furnace slag and coal ash. In connection with removal of carbon from coal ash in the cooler reference is made to U.S. Pat. No. 5,837,052, David B. Oates et al, issued Nov. 17, 1998, the teachings of which are incorporated herein by reference.

In this latter embodiment the coal ash is suitably introduced into the cooler in a region having a temperature of at least 500° C., and preferably 500 to 900° C., more preferably 700 to 750° C. to ensure that the coal ash is maintained in contact with the hot cement clinker for a residence time sufficient for oxidizing the carbon.

The fly ashes for introduction into the cooler in the production of blended cement are, in particular, Class F flyash or Class C flyash of ASTM C 618.

When such fly ashes have a content of carbon to be removed, the content of carbon may be 1 to 30%, more usually 1 to 15%, and typically 1 to 10%, by weight.

Figure 1:
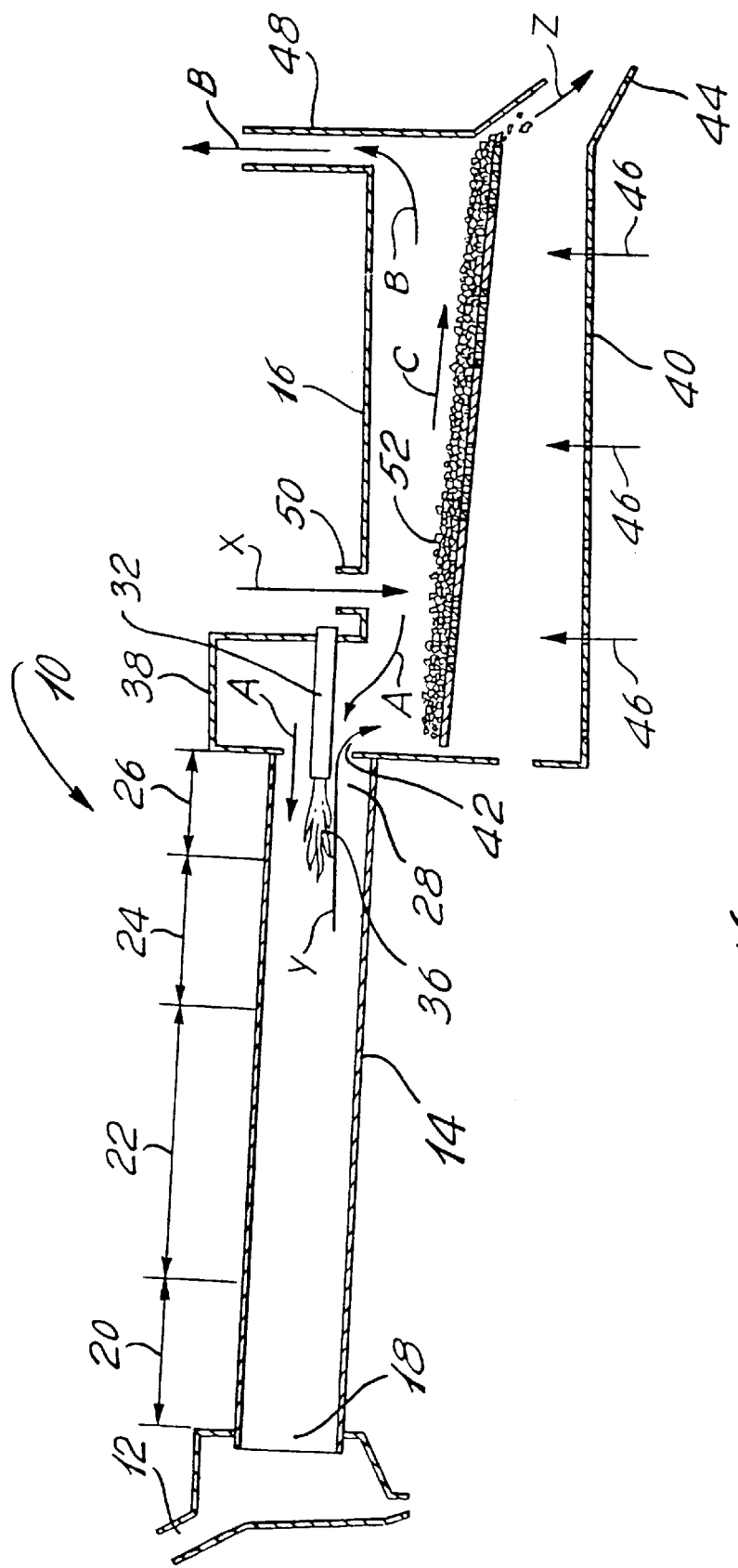
FIG. 1 is a schematic illustration of a kiln assembly including a kiln and a cooler.

DETAILED DESCRIPTION OF PREFERRED EMBODIMENT OF THE INVENTION WITH REFERENCE TO THE DRAWING

With further reference to FIG. 1, a kiln assembly 10 includes a feed inlet 12, a rotary kiln 14 and a cooler 16.

The kiln 14 is mounted for rotation relative to feed inlet 12 and cooler 16.

Rotary kiln 14 has a drying zone 20 for use in a wet process, a calcining zone 22, a burning zone 24 and an initial cooling zone 26.

Rotary kiln 14 extends between a feed port 18 and a clinker outlet 28.

A burner assembly 30 mounted externally of kiln 14 has a burner nozzle 32 mounted in a firing hood 38 which nozzle 32 extends through outlet 28 into kiln 14. A flame 36 is developed at nozzle 32.

Cooler 16 has an entry port 42 which communicates with clinker outlet 28 of kiln 14, and an exit port 44. A cooler grate 40 is mounted in cooler 16 and air jets 46 disposed below cooler grate 40 feed jets of cooling air upwardly through cooler grate 40 and a bed 52 of clinker supported on cooler grate 40.

Cooler 16 has an air discharge 48 and a feed port 50 for introducing a feed X of undried granulated blast furnace slag or pelletized blast furnace slag.

Cooler grate 40 comprises a plurality of plates in side-by-side relationship. Some of the plates have openings therethrough to allow passage of the cooling air. Some plates are fixed and other are mounted to oscillate, back and forth. The movement of the oscillating plates agitates the clinker, and with it the slag.

The cooler grate 40 is inclined downwardly from the entry port 42 to exit port 44. The bed 52 of clinker is advanced towards exit port 44 by the oscillation of some of the plates, in conjunction with the inclination and the build-up of clinker introduced into cooler 16 from kiln 14.

In operation raw cement clinker ingredients in particulate form are fed through inlet 12 and feed port 18 into kiln 14, where they first enter drying zone 20. The kiln 14 rotates slowly, and is inclined downwardly from port 18 to outlet 28. With the rotation of kiln 14, the ingredients advance slowly and sequentially through drying zone 20, calcining zone 22 and burning zone 24, into which a flame extends from burner nozzle 32.

In drying zone 20 the temperature typically ranges from 300° C. to 800° C. In calcining zone 22 the temperature typically ranges from 825° C. to 1000° C. and in burning zone 24 the temperature is typically 1400° C. to 1425° C.

Clinker formation is completed in burning zone 24.

The kiln 14 operates in conventional manner and the present invention is not concerned with the operation of kiln 14. Hot clinker produced in kiln 14 is discharged in a flow Y through clinker outlet 28 and enters cooler 16 at entry port 42 where it falls onto the cooler grate 40 which advances the hot clinker towards exit port 44. The hot clinker falling onto cooler grate 40 forms a bed 52 of clinker particles which typically has a thickness or depth of 6 to 24 inches.

Air is injected under pressure through air jets 46 located below cooler grate 40, the air permeates through plates in the cooler grate 40 and the bed 52, the clinker being progressively cooled by the air from jets 46 as it advances towards exit port 44. The cooler 16 is typically operated under low pressure or partial vacuum and the air permeating upwardly through bed 52 flows either along the path indicated by the arrows A into kiln 14 or along the path indicated by the arrows B exiting from the downstream end of the cooler. The path of travel of the bed 52 is indicated by the arrow C.

Undried slag is introduced to the clinker through port 50 at an upstream end of cooler 16. Port 50 represents merely one location where the undried slag may be introduced. The undried slag could, for example, also be introduced from below the bed 52 and so as to penetrate into the bed 52 with entrapment of the slag within the bed 52.

As the bed 52 with the slag travels towards exit port 44, the water content of the slag is volatilized or evaporated. At the downstream end of cooler 16, the cooled clinker and the dried slag free of water fall from cooler grate 40 through exit port 44 in a flow Z where they pass to further processing such as intergrinding for the manufacture of the cement.

Water vapor or steam formed in the drying of the slag is entrained in the air exiting discharge 48 along flow path B.

EXAMPLE i) Trial

A trial in a kiln assembly similar to that schematically illustrated in FIG. 1 would proceed in the following manner. An undried granulated blast furnace slag is employed. The undried slag typically has a water content of 10%, by weight, and exhibits a 10%, by weight, loss in the cooler.

The undried slag is introduced into the cooler 16, such as with a screw auger, at port 50. The screw auger is conveniently a 12 inch diameter screw. The screw auger feeds the undried slag progressively into the cooler 16 where it drops from the roof of the cooler 16, which roof is typically about 8 feet from the top of the plates defining the cooler grate 40. In a typical trial 6 tons of the undried slag are injected into the cooler with the screw auger during a period of one hour. Due to the limited capacity of the screw auger, 6 tons represents the maximum slag that can be injected.

The kiln is typically operated at a clinker production rate of 28 tons per hour so that the slag injection is about 25% of the clinker.

Clinker samples are collected prior to the trial and periodically during the trial. The samples was suitably collected at three locations, namely the kiln hood, the clinker exit and the cooler exhaust.

The collected clinker samples are analyzed for the loss on drying to determine any water present.

The results will show no loss on drying for the hood or for the clinker exit samples, indicating a complete volatilization or evaporation of water in the slag.

I claim:

1. A process for producing a blended cement comprising a cement clinker and a blast furnace slag comprising:

a) producing cement clinker from cement clinker raw ingredients in a cement kiln;

b) feeding hot cement clinker from step a) into a cooler;

c) feeding a blast furnace slag having a content of a water into contact with said hot cement clinker in said cooler and liberating said blast furnace slag of said water at a temperature above 100° C. in the presence of the hot cement clinker in said cooler; and d) recovering a cooled blend of said cement clinker and said blast furnace slag free of said water from said cooler.

2. A process according to claim 1, wherein said blast furnace slag is granulated blast furnace slag having a water content of 5 to 15%, by weight.

3. A process according to claim 2, wherein said granulated blast furnace slag comprises granules having a size less than 0.25 inches.

4. A process according to claim 1, wherein said blast furnace slag is pelletized blast furnace slag having a water content of 5 to 10%, by weight.

5. A process according to claim 4, wherein said pelletized blast furnace slag comprises pellets having a size less than 0.5 inches.

6. A process according to claim 2, wherein said blast furnace slag is fed in step c) in an amount of 25 to 70%, by weight, based on the total weight of the slag and the cement clinker.

7. A process according to claim 4, wherein said blast furnace slag is fed in step c) in an amount of 25 to 70%, by weight, based on the total weight of the slag and the cement clinker.

8. A process according to claim 1, wherein said hot cement clinker in step c) has a temperature of at least 150° C.

9. A process for producing a blended cement comprising a cement clinker, a blast furnace slag and a coal ash comprising:

a) producing cement clinker from cement clinker raw ingredients in a cement kiln;

b) feeding hot cement clinker from step a) into a cooler;

c) feeding a blast furnace slag having a content of a water into contact with said hot cement clinker in said cooler and liberating said blast furnace slag of said water at a temperature above 100° C. in the presence of the hot cement clinker in said cooler;

d) feeding an undried coal ash into contact with said clinker, in said cooler, for a residence time sufficient for volatilization of the water content of said coal ash, and e) recovering a cooled blended cement containing cement clinker, blast furnace slag free of water and coal ash free of water.

10. A process according to claim 9, wherein said coal ash is fly ash.

11. A process according to claim 9, wherein said coal ash is bottom ash.

12. A process for producing a blended cement comprising a cement clinker, a blast furnace slag and a coal ash comprising:

a) producing cement clinker from cement clinker raw ingredients in a cement kiln;

b) feeding hot cement clinker from step a) into a cooler;

c) feeding a blast furnace slag having a content of a water into contact with said hot cement clinker in said cooler and liberating said blast furnace slag of said water at a temperature above 100° C. in the presence of the hot cement clinker in said cooler;

d) feeding a coal ash having a content of carbon into contact with said clinker, in said cooler, for a residence time sufficient for oxidizing said carbon in the presence of the hot cement clinker in said cooler, and e) recovering a cooled blended cement containing cement clinker, blast furnace slag free of water and coal ash free of carbon.

13. A process according to claim 12, wherein said coal ash is a bottom ash.

14. A process according to claim 12, wherein said coal ash is a fly ash selected from Class F fly ash or Class C fly ash of ASTM C 618.

15. A process for producing a blended cement comprising a cement clinker and a blast furnace slag in an amount of 10 to 75%, by weight, based on the combined weight of clinker and blast furnace slag, comprising:

i) producing cement clinker from cement clinker raw ingredients in a cement kiln, ii) feeding hot cement clinker from step a) into a cooler at an upstream end of said cooler, iii) feeding said hot cement clinker along a path from said upstream end to a downstream end of said cooler, and exposing said clinker to cooling air in said path such that said clinker is progressively cooled from about 1300° C. to 120° C. as it travels from said upstream end to said down-stream end, iv) feeding a blast furnace slag having a water content of 3 to 20%, by weight, into contact with said clinker in said path, in an amount to provide 10 to 75%, by weight, blast furnace slag, based on the combined weight of clinker and slag, such that said slag contacts clinker having a temperature of at least 150° C., and maintaining said slag in contact with said clinker, in said cooler, for a residence time sufficient for volatilization of the water content of said slag while maintaining the integrity of the slag, and v) recovering a cooled blend of said cement clinker and said blast furnace slag free of water.

16. A process according to claim 15, wherein said slag comprises granulated blast furnace slag having a water content of 5 to 15%, by weight.

17. A process according to claim 15, wherein said slag comprises pelletized blast furnace slag having a water content of 5 to 10%, by weight.

18. A process according to claim 15, wherein said slag comprises air-cooled blast furnace slag.

19. A process according to claim 15, wherein said amount is to provide 25 to 70%, by weight, slag based on the combined weight of clinker and slag.

* * * * *